United States Patent
Kim et al.

(10) Patent No.: US 11,493,123 B2
(45) Date of Patent: Nov. 8, 2022

(54) OIL PATH STRUCTURE FOR POWERTRAIN FOR HYBRID VEHICLE

(71) Applicant: Hyundai Transys Inc., Seosan-si (KR)

(72) Inventors: Tae Hoon Kim, Hwaseong-si (KR); Yeon Ho Kim, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 218 days.

(21) Appl. No.: 16/951,603

(22) Filed: Nov. 18, 2020

(65) Prior Publication Data

US 2021/0356032 A1 Nov. 18, 2021

(30) Foreign Application Priority Data

May 14, 2020 (KR) .......................... 10-2020-0057877

(51) Int. Cl.
*F16H 57/04* (2010.01)
*F16H 57/02* (2012.01)

(52) U.S. Cl.
CPC ........... *F16H 57/043* (2013.01); *F16H 57/02* (2013.01); *F16H 57/0467* (2013.01); *F16H 57/0471* (2013.01); *F16H 57/0473* (2013.01); *F16H 2057/02034* (2013.01)

(58) Field of Classification Search
CPC .... F16H 57/043; F16H 57/02; F16H 57/0467; F16H 57/0473; F16H 2057/02034
See application file for complete search history.

(56) References Cited

U.S. PATENT DOCUMENTS

| | | | | |
|---|---|---|---|---|
| 8,869,653 | B2 * | 10/2014 | Fujita | B60K 6/26 |
| | | | | 74/331 |
| 9,188,195 | B2 * | 11/2015 | Iwasa | F16H 3/727 |
| 2009/0098969 | A1 * | 4/2009 | Tabata | B60K 6/365 |
| | | | | 903/910 |
| 2016/0153174 | A1 * | 6/2016 | Naito | E02F 9/02 |
| | | | | 903/910 |

FOREIGN PATENT DOCUMENTS

| | | |
|---|---|---|
| DE | 10-2012-221445 A1 | 6/2013 |
| JP | 5463252 B2 | 4/2014 |
| KR | 10-2009-0053017 A | 5/2009 |
| KR | 10-2010-0015063 A | 2/2010 |
| WO | 2012053361 A1 | 4/2012 |

\* cited by examiner

*Primary Examiner* — Colby M Hansen
(74) *Attorney, Agent, or Firm* — Novick, Kim & Lee, PLLC; Jae Youn Kim

(57) ABSTRACT

Provided is an oil path structure for powertrain for a hybrid vehicle, the oil path structure including: a P1 motor mounted in a housing and including a first stator and a first rotor; a P2 motor mounted in the housing so as to be spaced apart from the P1 motor at an interval and including a second stator and a second rotor; an input shaft having therein an oil passageway and having an outer circumference on which the P2 motor is mounted; and a first oil hole penetratively formed from the oil passageway of the input shaft toward a first bearing connected to a second rotor shaft of the second rotor.

9 Claims, 1 Drawing Sheet

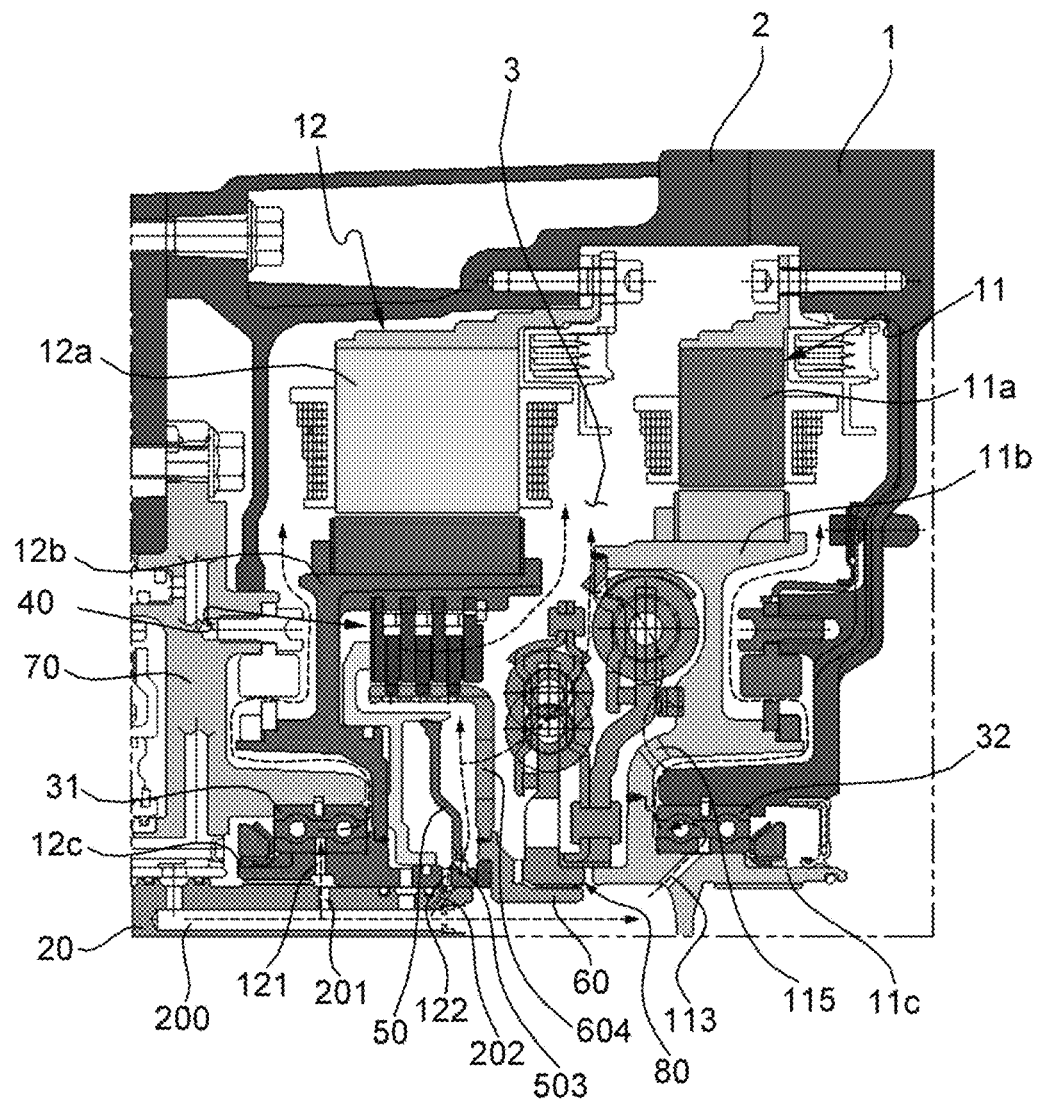

OIL PATH STRUCTURE FOR POWERTRAIN FOR HYBRID VEHICLE

CROSS-REFERENCE TO RELATED APPLICATIONS

This application claims priority to and the benefit of Korean Patent Application No. 10-2020-0057877 filed in the Korean Intellectual Property Office on May 14, 2020, the entire contents of which are incorporated herein by reference.

TECHNICAL FIELD

The present invention relates to an oil path structure for powertrain for a hybrid vehicle, which is used for lubrication and cooling.

BACKGROUND ART

In general, a hybrid vehicle refers to a vehicle driven by an efficient combination of two or more different types of power sources. The hybrid vehicle refers to a vehicle driven by an engine which obtains rotational force by combusting fuel (fossil fuel such as gasoline), and a motor which obtains rotational force from electric power of a battery.

Research is being actively conducted on the hybrid vehicle as a future vehicle capable of reducing exhaust gas and improving fuel economy by adopting the motor as an auxiliary power source as well as the engine.

The hybrid vehicle typically uses the engine and the motor. The hybrid vehicle uses the motor, as a main power source, which has relatively good low-speed torque characteristics, at a low speed, and uses the engine, as a main power source, which has relatively good high-speed torque characteristics, at a high speed. Therefore, in a low-speed section, the hybrid vehicle uses the motor while stopping the operation of the engine that uses fossil fuel, and thus the hybrid vehicle has an excellent effect of improving fuel economy and reducing exhaust gas.

A drive device for a hybrid vehicle allows the hybrid vehicle to travel in an electric vehicle (EV) mode which is a pure electric vehicle mode in which only the rotational force of the motor is used to drive the hybrid vehicle, or in an operation mode such as a hybrid electric vehicle (HEV) mode in which the rotational force of the motor is used as auxiliary power while the rotational force of the engine is used as main power. The mode is switched from the EV mode to the HEV mode by starting the engine.

A hybrid system in the related art may have inexpensive components in comparison with a high-voltage system and may implement an output at a level corresponding to a full hybrid level within a short time by a combination of two or more motors. In the hybrid system in the related art, positions of the motors are generally classified into P0, P1, P2, P3, and P4, and whether to implement the EV mode, regenerative braking performance, and the like vary depending on the positions of the motor.

Powertrain for a hybrid vehicle in the related art includes a P1 motor including a stator and a rotor, a P2 motor including a stator and a rotor, a torsion damper disposed between the P1 motor and the P2 motor, an input shaft support disposed at one side of the P2 motor, and an input shaft positioned at a center of the powertrain and configured to receive power.

However, in the powertrain for a hybrid vehicle in the related art, there is no oil path for lubricating bearings and cooling the P1 motor and the P2 motor, which causes a problem with lubrication and cooling performance.

Accordingly, the present invention is intended to provide a mechanism, in which oil holes are provided in the input shaft and the rotor of the P1 motor, thereby improving lubrication and cooling performance.

DOCUMENT OF RELATED ART

Patent Document (Patent Document 1) Korean Patent Application Laid-Open No. 10-2010-0015063 (Published on Feb. 12, 2010)

SUMMARY OF THE INVENTION

The present invention has been made in an effort to provide an oil path structure for powertrain for a hybrid vehicle, in which oil holes are provided in an input shaft and a rotor of a P1 motor, thereby improving lubrication and cooling performance.

An exemplary embodiment of the present invention provides an oil path structure for powertrain for a hybrid vehicle, the oil path structure including: a P1 motor mounted in a housing and including a first stator and a first rotor; a P2 motor mounted in the housing so as to be spaced apart from the P1 motor at an interval and including a second stator and a second rotor; an input shaft having therein an oil passageway and having an outer circumference on which the P2 motor is mounted; and a first oil hole penetratively formed from the oil passageway of the input shaft toward a first bearing connected to a second rotor shaft of the second rotor.

The housing may include a first housing; and a second housing coupled to the first housing.

A first passageway may be provided in the second rotor shaft, and the first passageway may match the first oil hole and may be penetratively formed toward the first bearing.

A second oil hole spaced apart from the first oil hole at an interval may be provided at a portion corresponding to an engine clutch disposed outside the input shaft, and the second oil hole may communicate with the oil passageway and may be penetratively formed toward the engine clutch.

A second passageway may be provided in the second rotor shaft, and the second passageway may communicate with the second oil hole and connect to the engine clutch.

A first frame coupled to the second rotor shaft may be provided in the engine clutch, and a third passageway, through which oil is movable, may be provided at a coupling portion between the second rotor shaft and the first frame.

A second frame may be provided at one side of the first frame, a fourth passageway communicating with the third passageway may be provided in the second frame, and the fourth passageway may guide a movement of oil to a region between the P1 motor and the P2 motor.

A third oil hole may be provided in a first rotor shaft of the first rotor, and the third oil hole may be penetratively formed toward a second bearing so that the oil in the oil passageway is movable to the second bearing coupled to the first rotor shaft.

A fifth passageway may be provided in the first rotor, and the fifth passageway may communicate with the third oil hole and may be penetratively formed toward a torsion damper positioned between the first rotor and the second rotor.

According to the present invention, the first oil hole, the second oil hole, and the third oil hole may improve lubrication and cooling performance.

According to the present invention, it is possible to supply lubricating oil to all devices mounted in the first housing and the second housing through the first oil hole, the second oil hole, and the third oil hole.

According to the present invention, it is possible to cool the P1 motor and the second motor by supplying oil to the P1 motor and the second motor through the first oil hole, the second oil hole, and the third oil hole.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a view illustrating an oil path structure for powertrain for a hybrid vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the FIGURES, reference numbers refer to the same or equivalent parts of the present invention throughout the several FIGURES of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly-known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

In powertrain for a hybrid vehicle in the related art, there is no oil path for lubricating bearings and cooling a P1 motor and a P2 motor, which causes a problem with lubrication and cooling performance. Accordingly, the present invention is intended to provide a mechanism, in which oil holes are provided in the input shaft and the rotor of the P1 motor, thereby improving lubrication and cooling performance.

FIG. 1 is a view illustrating an oil path structure for powertrain for a hybrid vehicle according to an exemplary embodiment of the present invention.

As illustrated in FIG. 1, the present invention includes a P1 motor 11 mounted in a first housing 1, a P2 motor 12 mounted in a second housing 2, and an input shaft 20 on which the P2 motor 12 is mounted. The input shaft 20 has a first oil hole 201 and a second oil hole 202. The first housing 1 and the second housing 2 may be coupled by means of a coupling member such as a bolt or a nut.

The P1 motor 11 includes a first stator 11a and a first rotor 11b. The second motor 12 includes a second stator 12a and a second rotor 12b. The first rotor 11b has a first rotor shaft 11c. The second rotor 12b has a second rotor shaft 12c.

An oil passageway 200 is provided in the input shaft 20. The oil passageway 200 is a passageway through which oil moves. The second rotor 12b of the P2 motor 12 is coupled to an outer circumference of the input shaft 20. The second rotor 12b surrounds the outer circumference of the input shaft 20.

The first oil hole 201 is a through hole penetratively formed from the oil passageway 200 of the input shaft 20 toward a first bearing 31 coupled to the second rotor shaft 12c. The first oil hole 201 is a passageway through which the oil moves. For example, the first oil hole 201 may be a vertical through hole. The oil supplied to the oil passageway 200 may move to the first bearing 31 through the first oil hole 201.

The second rotor shaft 12c includes a first passageway 121 and a second passageway 122. The first passageway 121 and the second passageway 122 are passageways through which the oil moves.

The first passageway 121 matches the first oil hole 201. For example, the first passageway 121 may be a vertical through hole penetratively formed toward the first bearing 31.

The oil supplied to the oil passageway 200 of the input shaft 20 may move to the first bearing 31 via the first oil hole 201 and the first passageway 121, and then move to a space between the second motor 12 and an input shaft support 70. The input shaft support 70 is supported by the first bearing 31. The input shaft support 70 surrounds the input shaft 20.

The second oil hole 202 is spaced apart from the first oil hole 201 at an interval and provided close to an engine clutch 40. The second oil hole 202 is a through hole penetratively formed from the oil passageway 200 to the engine clutch 40. For example, the second oil hole 202 may be an inclined through hole. The oil supplied to the oil passageway 200 may move to the engine clutch 40 through the second oil hole 202.

The second rotor shaft 12c has the second passageway 122. The second passageway 122 communicates with the second oil hole 202 and connects to the inside of the engine clutch 40. The oil supplied to the oil passageway 200 moves to the engine clutch 40 via the second oil hole 202 and the second passageway 122.

The engine clutch 40 includes a first frame 50 and a second frame 60. The first frame 50 is provided in the engine clutch 40. The first frame 50 is connected to the second rotor shaft 12c while surrounding the input shaft 20.

A third passageway 503, through which the oil may move, is provided in a coupling portion between the second rotor shaft 12c and the first frame 50. The oil passing through the second oil hole 202 and the second passageway 122 may move to the engine clutch 40 through the third passageway 503.

The second frame 60 is provided at one side of the first frame 50. The second frame 60 has a fourth passageway 604. A part of the oil passing through the third passageway 503 may move to the engine clutch 40, and another part of the oil may move to a torsion damper 80 through the fourth passageway 604, and then move to a region 3 between the P1 motor 11 and the P2 motor 12 to cool the P1 motor 11 and the P2 motor 12.

The first rotor shaft 11c has a third oil hole 113. The third oil hole 113 is penetratively formed in the first rotor shaft 11c in a direction of a second bearing 32. For example, the third oil hole 113 may be an inclined through hole. The inside of the first rotor shaft 11c communicates with the oil passageway 200 of the input shaft 20.

The oil supplied to the oil passageway 200 of the input shaft 20 may be supplied to the second bearing 32 through the third oil hole 113, and then supplied to a space between the P1 motor 11 and the first housing 1.

The first rotor 11b has a fifth passageway 115. The fifth passageway 115 is penetratively formed toward the torsion damper 80. The fifth passageway 115 is a passageway connected to the inside of the first housing 1 and the inside of the second housing 2 in which the torsion damper 80 is mounted. A part of the oil passing through the third oil hole 113 moves into the first housing 1, and another part of the oil moves into the second housing 2 while passing through the fifth passageway 115.

The movement route of the oil will be described again. As indicated by the arrow illustrated in FIG. 1, the oil supplied to the oil passageway 200 of the input shaft 20 may move to the first bearing 31 for supporting the P2 motor 12 through the first oil hole 201 and move between the input shaft support 70 and the second motor 12, thereby lubricating the peripheral devices.

The oil supplied to the oil passageway 200 of the input shaft 20 may move to the engine clutch 40 through the second oil hole 202 and move to the region 3 between the P1 motor 11 and the P2 motor 12, thereby lubricating the peripheral devices.

The oil supplied to the oil passageway 200 of the input shaft 20 may move to the second bearing 32 through the third oil hole 113 and move between the P1 motor 11 and the first housing 1, thereby lubricating the peripheral devices.

As described above, according to the present invention, the oil may be smoothly supplied, through the first oil hole 201, the second oil hole 202, and the third oil hole 113, to all the devices mounted in the first housing 1 and the second housing 2, thereby effectively lubricating the devices.

The oil, which has passed through the third oil hole 113 and then flowed out through the second bearing 32 and the torsion damper 80, may be supplied to the P1 motor 11 and the P2 motor 12, thereby cooling the P1 motor 11 and the P2 motor 12.

Although not illustrated in the drawings, the oil may be supplied to the oil passageway 200 of the input shaft 20 by an electric oil pump (EOP).

As described above, according to the present invention, the first oil hole, the second oil hole, and the third oil hole may improve lubrication and cooling performance. In addition, according to the present invention, it is possible to supply lubricating oil to all devices mounted in the first housing and the second housing through the first oil hole, the second oil hole, and the third oil hole. In addition, according to the present invention, it is possible to cool the P1 motor and the second motor by supplying oil to the P1 motor and the second motor through the first oil hole, the second oil hole, and the third oil hole.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the exemplary embodiments disclosed in the present invention and the accompanying drawings are intended not to limit but to describe the technical spirit of the present invention, and the scope of the technical spirit of the present invention is not limited by the exemplary embodiments and the accompanying drawings. The protective scope of the present invention should be construed based on the following claims, and all the technical spirit within the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An oil path structure for powertrain for a hybrid vehicle, the oil path structure comprising:
   a P1 motor mounted in a housing and comprising a first stator and a first rotor;
   a P2 motor mounted in the housing so as to be spaced apart from the P1 motor at an interval and comprising a second stator and a second rotor;
   an input shaft having therein an oil passageway and having an outer circumference on which the P2 motor is mounted; and
   a first oil hole penetratively formed from the oil passageway of the input shaft toward a first bearing connected to a second rotor shaft of the second rotor.

2. The oil path structure of claim 1, wherein the housing comprises:
   a first housing; and
   a second housing coupled to the first housing.

3. The oil path structure of claim 1, wherein a first passageway is provided in the second rotor shaft, and the first passageway matches the first oil hole and is penetratively formed toward the first bearing.

4. The oil path structure of claim 1, wherein a second oil hole spaced apart from the first oil hole at an interval is provided at a portion corresponding to an engine clutch disposed outside the input shaft, and the second oil hole communicates with the oil passageway and is penetratively formed toward the engine clutch.

5. The oil path structure of claim 4, wherein a second passageway is provided in the second rotor shaft, and the second passageway communicates with the second oil hole and connects to the engine clutch.

6. The oil path structure of claim 5, wherein a first frame coupled to the second rotor shaft is provided in the engine clutch, and a third passageway, through which oil is movable, is provided at a coupling portion between the second rotor shaft and the first frame.

7. The oil path structure of claim 6, wherein a second frame is provided at one side of the first frame, a fourth passageway communicating with the third passageway is provided in the second frame, and the fourth passageway guides a movement of oil to a region between the P1 motor and the P2 motor.

8. The oil path structure of claim 1, wherein a third oil hole is provided in a first rotor shaft of the first rotor, and the third oil hole is penetratively formed toward a second bearing so that the oil in the oil passageway is movable to the second bearing coupled to the first rotor shaft.

9. The oil path structure of claim 8, wherein a fifth passageway is provided in the first rotor, and the fifth passageway communicates with the third oil hole and is penetratively formed toward a torsion damper positioned between the first rotor and the second rotor.

* * * * *